(12) United States Patent
Olander

(10) Patent No.: US 10,935,162 B2
(45) Date of Patent: Mar. 2, 2021

(54) DEVICE AND METHOD FOR PULLING PIPE

(71) Applicant: TT Technologies, Inc., Aurora, IL (US)

(72) Inventor: John A. Olander, Aurora, IL (US)

(73) Assignee: TT Technologies, Inc., Aurora, IL (US)

( * ) Notice: Subject to any disclaimer, the term of this patent is extended or adjusted under 35 U.S.C. 154(b) by 0 days.

(21) Appl. No.: 16/392,008

(22) Filed: Apr. 23, 2019

(65) Prior Publication Data

US 2019/0323628 A1    Oct. 24, 2019

Related U.S. Application Data

(60) Provisional application No. 62/661,777, filed on Apr. 24, 2018.

(51) Int. Cl.
| | |
|---|---|
| *B65H 49/24* | (2006.01) |
| *F16L 1/028* | (2006.01) |
| *B65H 54/02* | (2006.01) |
| *B65H 79/00* | (2006.01) |
| *F16L 1/06* | (2006.01) |
| *F16L 55/165* | (2006.01) |

(52) U.S. Cl.
CPC .............. *F16L 1/028* (2013.01); *B65H 49/24* (2013.01); *B65H 54/02* (2013.01); *B65H 79/00* (2013.01); *F16L 1/06* (2013.01); *F16L 55/1658* (2013.01); *B65H 2403/93* (2013.01)

(58) Field of Classification Search
CPC .......... F16L 1/028; F16L 1/06; F16L 55/1658
See application file for complete search history.

(56) References Cited

U.S. PATENT DOCUMENTS

| | | | |
|---|---|---|---|
| 3,494,374 A | | 2/1970 | Castela et al. |
| 4,006,521 A | * | 2/1977 | Pedone ................... F16L 1/024 29/282 |
| 4,637,756 A | | 1/1987 | Boles |
| 4,669,705 A | * | 6/1987 | Langston ................. H02G 1/08 254/134.3 FT |
| 5,013,188 A | * | 5/1991 | Campbell ................. E21B 7/30 405/184 |
| 5,211,509 A | * | 5/1993 | Roessler ................. F16L 1/065 254/29 R |
| 5,653,554 A | * | 8/1997 | Preston ................... F16L 55/26 294/86.25 |

(Continued)

FOREIGN PATENT DOCUMENTS

KR     101524666 B1    6/2015

OTHER PUBLICATIONS

"European Application Serial No. 19170930.2, Extended European Search Report dated Sep. 13, 2019", 8 pgs.

(Continued)

*Primary Examiner* — Benjamin F Fiorello

(74) *Attorney, Agent, or Firm* — Schwegman Lundberg & Woessner, P.A.

(57) ABSTRACT

A pipe puller system and methods of pipe extraction are shown. In one example a pipe to be replaced is pulled by attaching a pulling force to multiple locations along a length of the pipe. In one example pulling forces can be varied between different attachment locations to better control or eliminate tearing of the pipe. In one example, a pipe loosening device may be used prior to pulling the pipe from the ground.

21 Claims, 9 Drawing Sheets

(56) References Cited

U.S. PATENT DOCUMENTS

| | | | | |
|---|---|---|---|---|
| 5,984,582 A * | 11/1999 | Schwert | ................... | E21B 23/00 |
| | | | | 138/97 |
| 6,149,349 A * | 11/2000 | Nikiforuk | ................ | E02F 3/963 |
| | | | | 175/53 |
| 7,341,404 B2 * | 3/2008 | Tjader | ................. | F16L 55/1658 |
| | | | | 138/97 |
| 9,175,798 B1 * | 11/2015 | Thompson | ........... | F16L 55/1658 |
| 9,975,742 B1 * | 5/2018 | Mason | ..................... | B66D 1/46 |
| 10,167,986 B2 * | 1/2019 | Tjader | ................. | F16L 55/1658 |
| 2003/0017008 A1 * | 1/2003 | Robinson | ............ | F16L 55/1658 |
| | | | | 405/184.3 |
| 2004/0265067 A1 * | 12/2004 | Putnam | ............... | F16L 55/1658 |
| | | | | 405/184.3 |
| 2007/0048090 A1 | 3/2007 | Wentworth et al. | | |
| 2009/0123234 A1 * | 5/2009 | Venable | .................... | E03F 3/06 |
| | | | | 405/156 |
| 2010/0178113 A1 | 7/2010 | Tjader | | |
| 2011/0188943 A1 * | 8/2011 | Wentworth | ......... | F16L 55/1658 |
| | | | | 405/184.3 |
| 2013/0238135 A1 * | 9/2013 | Fisher | .................. | F16M 11/425 |
| | | | | 700/275 |
| 2014/0091268 A1 * | 4/2014 | Heravi | ................... | B66D 1/505 |
| | | | | 254/274 |
| 2016/0096709 A1 * | 4/2016 | Averill | ..................... | B66D 1/12 |
| | | | | 254/267 |
| 2018/0045334 A1 * | 2/2018 | Nippes | .................... | E03B 7/006 |
| 2018/0195641 A1 * | 7/2018 | Olander | ................. | E21B 19/16 |

OTHER PUBLICATIONS

"European Application Serial No. 19170930.2, Response filed Apr. 28, 2020 to Extended European Search Report dated Sep. 13, 2019", 27 pgs.

"European Application Serial No. 19170930.2, Communication Pursuant to Article 94(3) EPC dated Jul. 28, 2020", 4 pgs.

* cited by examiner

DEVICE AND METHOD FOR PULLING PIPE

CLAIM OF PRIORITY

This patent application claims the benefit of priority, under 35 U.S.C. § 119(e), to U.S. Provisional Patent Application Ser. No. 62/661,177, entitled "DEVICE AND METHOD FOR PULLING PIPE," filed on Apr. 24, 2018, which is hereby incorporated by reference herein in its entirety.

TECHNICAL FIELD

Embodiments described herein generally relate to pulling a section of pipe. Selected specific examples relate to removing pipe from the ground.

BACKGROUND

Pipe bursting is an existing technique where an old pipe is replaced by bursting the old pipe into the surrounding soil. A new pipe is then pulled into place where the old burst pipe once was. This technique is desirable because the old pipe may be replaced without digging a trench to access it. In some instances it may be desirable to replace an old pipe trenchlessly, however, it may also be desirable to remove the old pipe from the ground. One example includes replacement of lead pipes. It is desirable to replace the pipe trenchlessly to avoid disturbing top surface structures such as roadways. However it is desirable to remove the lead pipe completely because lead may be hazardous to the environment. It may also be desirable to remove other pipe materials from the ground, such as copper or steel, for other reasons that do not involve environmental concerns.

Devices and methods are desired to accomplish these and other goals.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
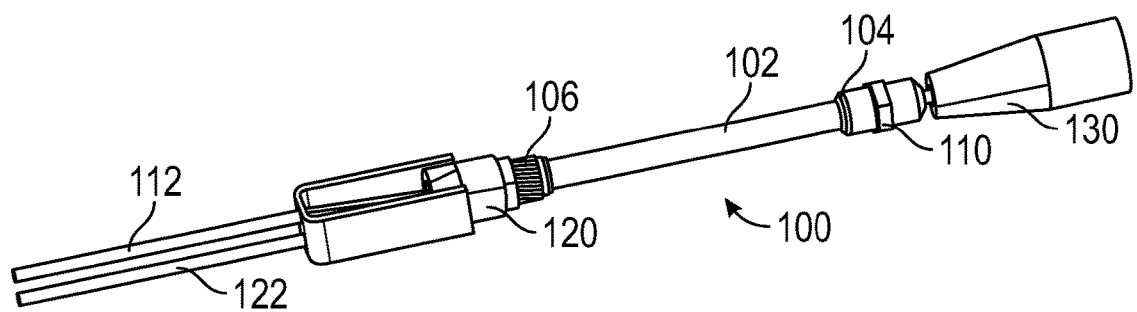
FIG. 1A is a perspective view of selected components of a pipe puller system in accordance with some embodiments of the invention.

FIG. 1A shows a pulling system 100 coupled to a section of pipe 102 according to one example. The pipe 102 is typically buried in the ground, and methods and devices described in the present disclosure may be used to extract the pipe 102 from the ground. It should be noted, however, that the devices and methods for pulling pipe may be used to pull pipes in other settings apart from being buried in the ground.

A collar 120 is shown coupled to a proximal end 106 of the pipe 102 in FIG. 1A. A lug 110 is shown coupled to a distal end 104 of the pipe 102. A first cable 112 is coupled to the lug 110, thus coupling the first cable 112 to the distal end 104 of the pipe 102. A second cable 122 is coupled to the collar 120, thus coupling the second cable 122 to the proximal end 106 of the pipe 102.

Figure 1B:
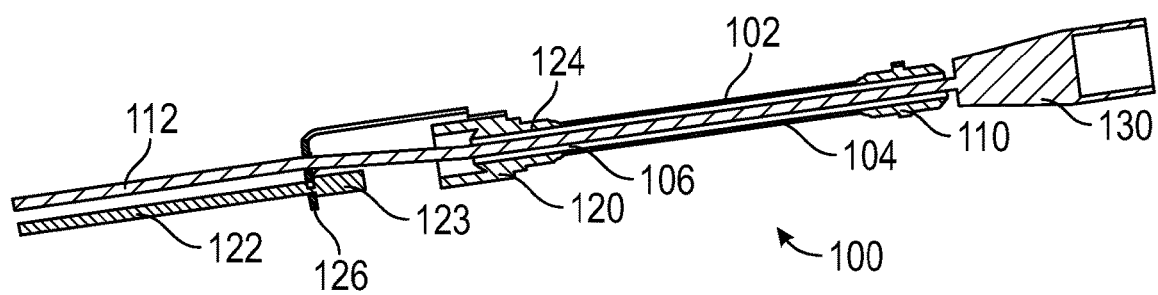
FIG. 1B is a cross section perspective view of the pipe puller system from FIG. 1A in accordance with some embodiments of the invention.

FIG. 1B shows a cross section of the pulling system 100. In the example shown, the first cable 112 can be seen passing through an opening in the collar 120 and passing on to the distal end 104 of the pipe 102. FIG. 1B also shows two specific examples of coupling the first cable 112 to the distal end of the pipe 104, and coupling the second cable 122 to the proximal end of the pipe 106.

In the example shown, the first cable 112 is attached to and expander 130 using a swage button or a segmented collet type gripping device. When pulled, the expander 130 abuts the lug 110 and applies compression force against the distal end 104 of the pipe 102. Further, in the example shown, the second cable 122 includes a swage button 123 that is coupled within a swage pocket 126 in the collar 120. When pulled, the swage button 123 applies tension force to the collar 120, and as a result, to the proximal end 106 of the pipe 102.

In operation, pulling old pipes from the ground can be difficult. Often when pulling from only the proximal end, the high forces needed to overcome friction with the surrounding soil exceed the tensile strength of the pipe, and the pipe tears in a middle portion, leaving the distal end still in the ground. Another undesired possibility is when pulling only from a distal end, the high forces needed to overcome friction with the surrounding soil exceed a buckle strength of the pipe, and the pipe buckles on itself at the distal end, or within a middle portion still underground. As with the scenario of only pulling from the proximal end, this results in an unwanted scenario, where part of the pipe is still in the ground, and the remaining part will likely have to be excavated in order to fully remove the old pipe.

Using examples of a pulling system 100 as shown in FIGS. 1A and 1B, extraction force may be applied to more than one location of the pipe. This allows additional extraction force to be exerted without tearing or buckling the pipe. By attaching at both a proximal end 106, and a distal end 104, the additional extraction force can be applied at the ends that are easily accessible, without the need for messy or time consuming adhesives along a middle portion of the pipe 102.

Using configurations shown in FIGS. 1A and 1B, an additional advantage is the ability to adjust a force differential between the first cable 112 and the second cable 122. For example, the distal end 104 of the pipe 102 may be able to withstand a higher amount of compression force before buckling when compared to a threshold tensile force on the proximal end. In such a case, the first cable 112 (coupled to the distal end 104) may be pulled using a higher force than the second cable 122 (coupled to the proximal end 106).

In an additional example, instead of a collar 120 coupled to a proximal end 106, other attachment mechanisms may be used. In one example, a wire mesh gripper (also known informally as a Chinese finger grip) may be used. In one example, a wire mesh gripper is used when pulling lead pipe. Lead pipe is softer than some pipe materials such as steel. In one example, a wire mesh gripper provides sufficient grip on a soft material such as lead, and spreads the gripping force over a larger surface area, leading to a lower change of tearing of the lead pipe. In select examples, a wire mesh gripper may be used on a proximal end 106 for all pipe materials where sufficient grip may be obtained.

Figure 2A:
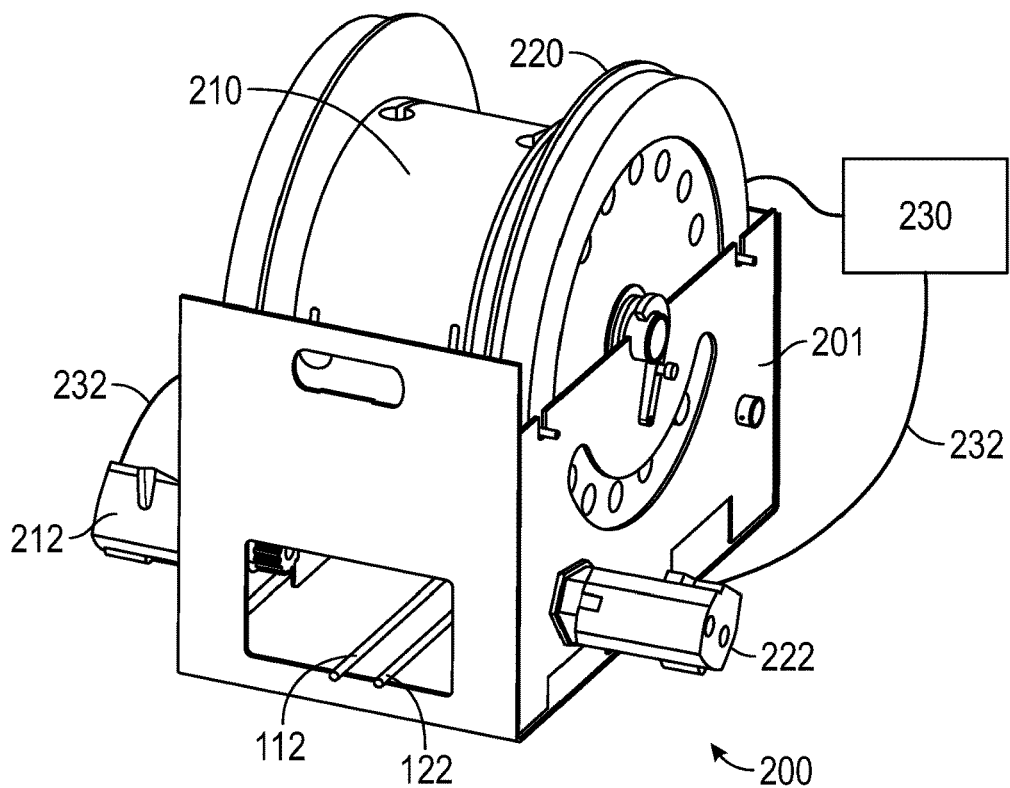
FIG. 2A is a perspective view of a cable puller in accordance with some embodiments of the invention.
Figure 2B:
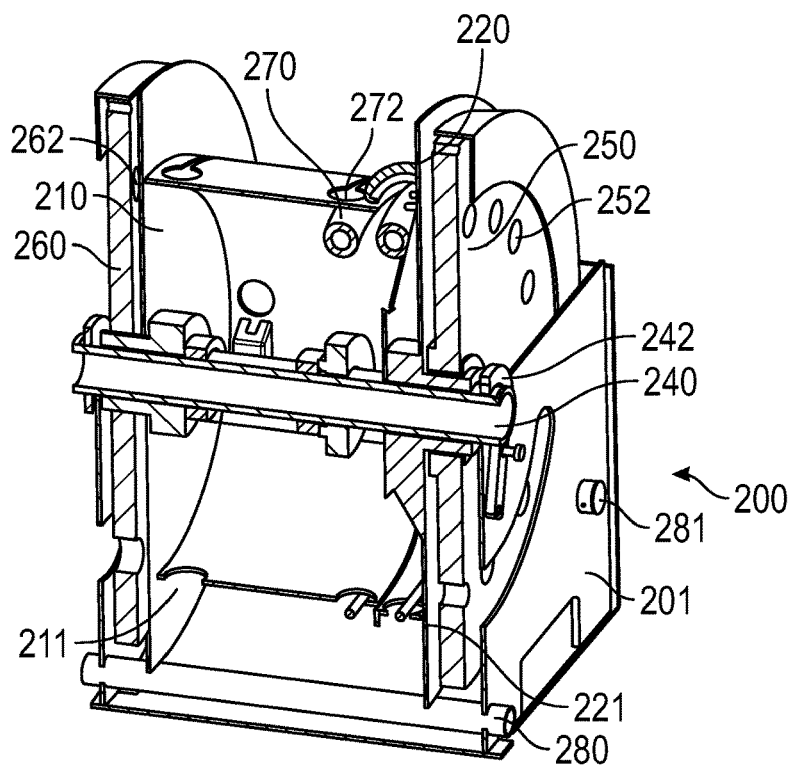
FIG. 2B is a cross section perspective view of the cable puller from FIG. 2A in accordance with some embodiments of the invention.

FIGS. 2A and 2B show a cable puller 200 that may be used to power a pulling system as described in the present disclosure, such as the pulling system 100 from FIGS. 1A and 1B. FIG. 2A shows a first drum 210 coupled to a first drive motor 212, and a second drum 220 coupled to a second drive motor 222. In one example, the first drum 210 is rotatable separately from the second drum 220. A drive controller 230 is shown in block diagram format. The drive controller 230 is coupled to the first drive motor 212 and the second drive motor 222 using communication lines 232 as illustrated. FIG. 2A shows the first cable 112 from FIGS. 1A and 1B spooling onto the first drum 210. Likewise, FIG. 2A shows the second cable 122 spooling onto the second drum 220. Although two drive motors are shown, more than two drive motors may be used to increase drive power if necessary.

In one example, the drive controller 230 is adapted to control the first drive motor 212 and the second drive motor 222 to drive the first drum and the second drum at the same time and to adjust a pulling force independently for each of the first drum 210 and the second drum 220. Although a pulling force may be independently adjusted, the invention does not require that the pulling forces be different between the two drums. However, as noted above, it may be advantageous in selected circumstances to provide pulling forces that are different from one another. FIG. 2A shows the drive controller 230 coupled to the first drive motor 212 and the second drive motor 222 through communication lines 232. In one example, the communication lines 232 are electrical. In one example, the communication lines 232 are hydraulic. Although physical communication lines are shown, the invention is not so limited. In one example, communication with the first drive motor 212 and the second drive motor 222 is wireless, through a protocol such as WiFi, Bluetooth, or another suitable communication protocol. In one example, the controller 230 is physically integrated on a frame 201 of the cable puller 200. In other examples, the controller 230 may be a separate unit, and operate from a physically separate location, while in communication with the first drive motor 212 and the second drive motor 222.

In one example, the first drive motor 212 and the second drive motor 222 are hydraulic motors, however the invention is not so limited. Other examples of drive motors include electric motors, internal combustion driven motors, gear reduction driven motors, etc.

FIG. 2B shows additional detail of the cable puller 200 in cross section. One example of a coupling configuration between cables and drums is shown. A swage cable end 270 may be inserted in a slot 272 within a drum. As shown in FIG. 2B, a pair of swage cable ends 270 may be used for the pair of cables 112, 122. Although a swage connection is effective and inexpensive, the invention is not so limited. Other connection systems may be used, such as collet type cable grippers, clamps, bolts, etc.

FIG. 2B also shows guide bars 280, 281 that form a close fit against flanges 211, 221 of the drums 210, 220. In one example, the guide bars 280, 281 help ensure that the old pipe spools onto the drums 210, 220 and does not spool outside the flanges 211, 221.

A common axle 240 is shown, on which both the first drum 210 and the second drum 220 rotate. In the example of FIGS. 2A and 2B, a latch 242 is included for optional removal of the axle 240 which may facilitate removal and/or replacement of one or more of the first drum 210 and the second drum 220. In one example, when old pipe is pulled from the ground, and wound around one or more of the first drum 210 and the second drum 220 it may be desirable to remove a drum that is filled with removed old pipe, and replace the filled drum with a fresh drum. This method of operation will be described in more detail below. In other examples, a filled drum may be spun backwards either under power, or manually, to remove pipe that has been removed from the ground from one or more of the drums. In such an example, after removal of the old pipe, additional pipe pulling operations may be performed.

FIG. 2B shows further detail of an example drive system. In FIG. 2B, an first drive gear 260 is shown on one side of the first drum 210, and a second drive gear 250 is shown on one side of the second drum 220. In one example, the drive gears 250, 260 each engage a corresponding toothed gear on the first drive motor 212 and the second drive motor 222. In one example both drive gears include a number of spaced holes 252 or other engaging features. In one example, the drive gears 250, 260 may be selectively coupled to the first drum 210 and the second drum 220 by placing a pin (not shown) through a selected hole 252. The pin would then drive the drive 250 with the second drum 220 when inserted, and when removed, would allow the second drum 220 to rotate freely with respect to the second drive gear 250. In one example, the first drive gear 260 and the first drum 210 operate in a similar manner.

As noted above, in one example, it may be advantageous to periodically remove old pipe from a filled drum in order to continue pulling additional pipe. One method of removing old pipe from a drum includes removing a pin or other engaging structure between a drive gear 250, 260 and a drum 210, 220 to allow the drum 210, 220 to rotate freely until the old pipe has been removed. The pin or other engaging structure may then be replaced, or re-engaged to continue pulling.

Figure 3A:
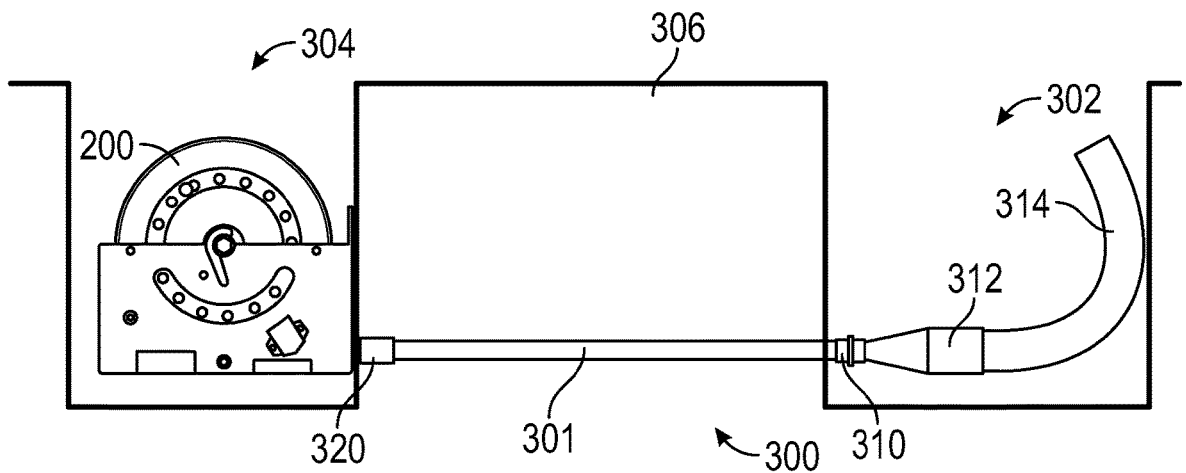
FIG. 3A is a side view of a pipe puller system in operation in accordance with some embodiments of the invention.
Figure 3B:
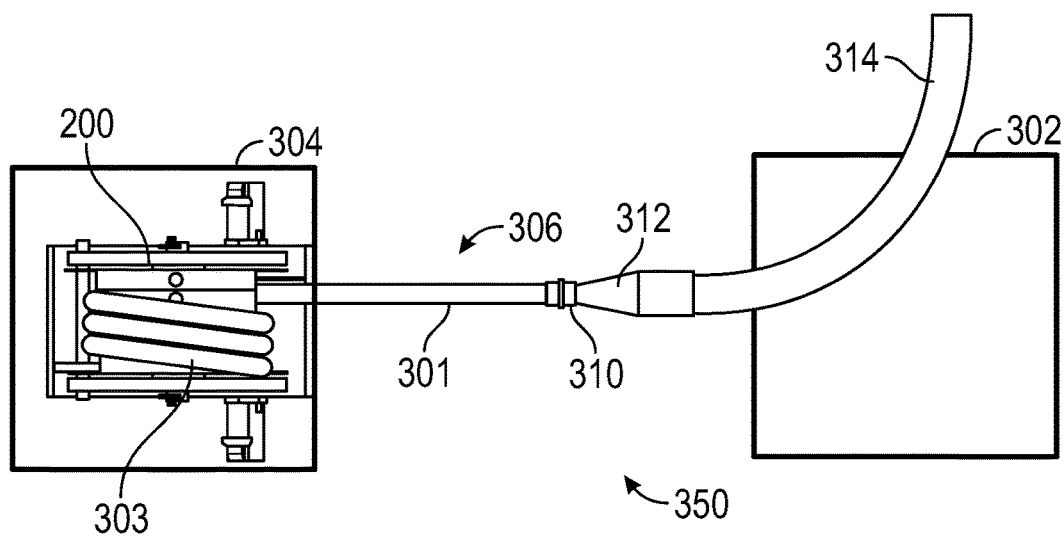
FIG. 3B is a top view of a pipe puller system in operation in accordance with some embodiments of the invention.

FIGS. 3A and 3B illustrate one method of operation of a pipe puller system 300 according to examples of the invention. In FIG. 3A, a pipe to be replaced 310 is shown buried in the ground 306. An entrance pit 302 and an exit pit 304 are dug between the section of pipe to be replaced 310. A cable puller 200 is shown located within the exit pit 304. A collar 320, similar to the collar 120 described in FIGS. 1A and 1B, is shown coupled to a proximal end of the pipe to be replaced 310. A lug 310, similar to the lug 110 described in FIGS. 1A and 1B, is also shown coupled to a distal end of the pipe to be replaced 310. Although not shown in FIG. 3A, a first cable and a second cable are coupled to the collar and lug respectively, as described in examples above.

In the example of FIG. 3A, an expander 312 is also shown coupled to a distal end of the pipe to be replaced 310. In FIG. 3A, a new pipe 314 is coupled behind the expander 312.

As described in examples above, when using a first and second cable, in conjunction with a collar and lug, extraction force may be applied to more than one location of the pipe. This allows additional extraction force to be exerted without tearing or buckling the pipe. As shown in FIG. 3B, after actuating the cable puller 200, the pipe to be replaced 310 is pulled from the ground, and spooled around one or more drums of the cable puller 200. FIG. 3B illustrates a number of windings 303 of the pipe to be replaced 310 as then are spooled on the drum or drums and extracted from the ground 306. In the option shown in FIGS. 3A and 3B, the new pipe 314 is also drawn into the ground at the same time that the pipe to be replaced 310 is removed. The addition of the expander 312 further facilitates pulling in the new pipe 314 by expanding the surrounding soil to make room for the new pipe 314.

Figure 4A:
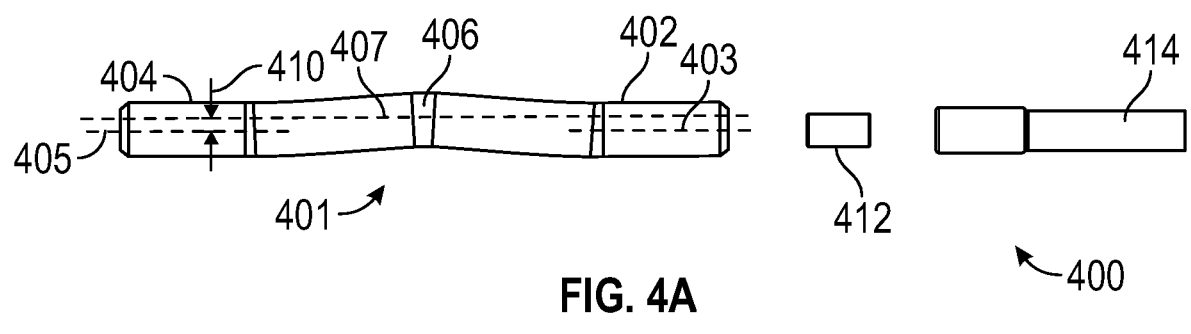
FIG. 4A is a pipe loosening device in accordance with some embodiments of the invention.
Figure 4B:
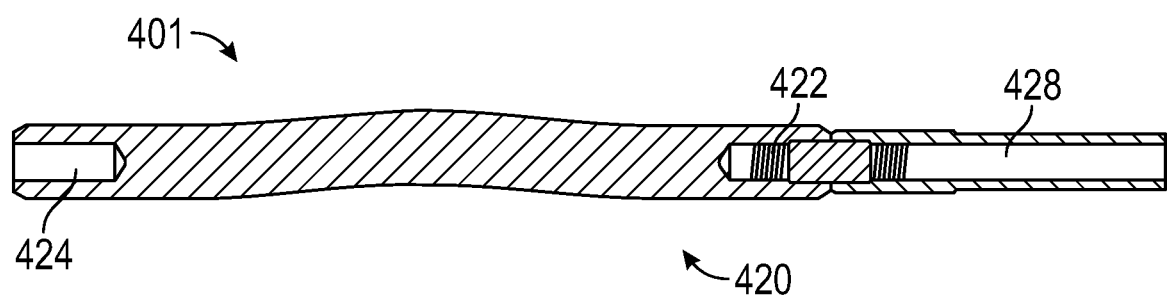
FIG. 4B is another pipe loosening device in accordance with some embodiments of the invention.
Figure 4C:
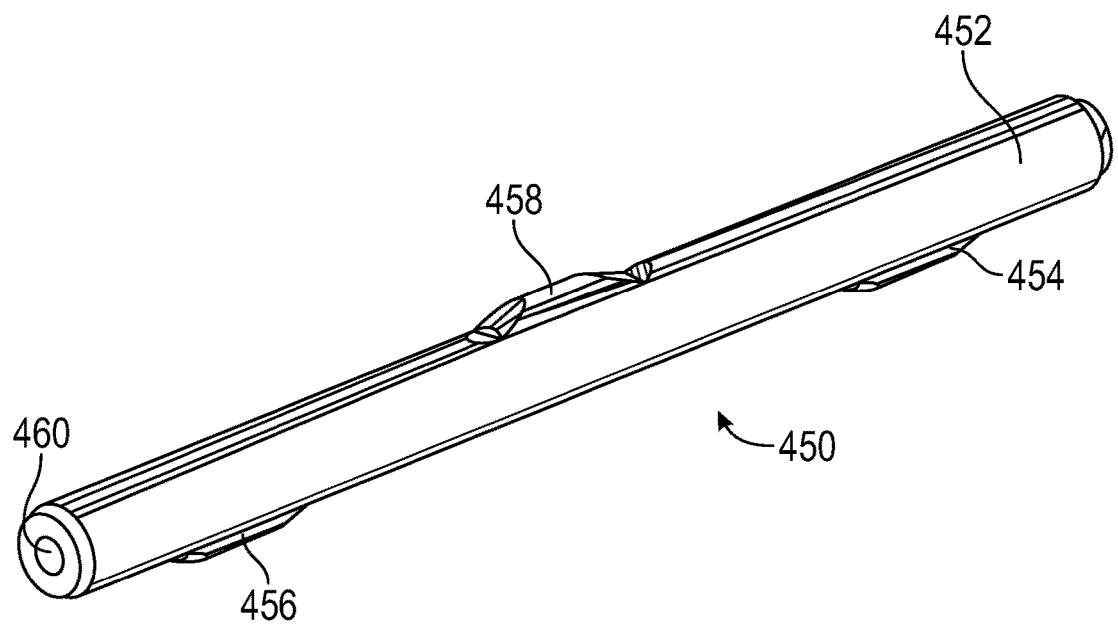
FIG. 4C is another pipe loosening device in accordance with some embodiments of the invention.

FIGS. 4A-4C show an additional tool that may be used in conjunction with pipe puller systems described above to further facilitate removal of old pipe from the ground. FIG. 4A shows a pipe loosening device 400 according to one example. The pipe loosening device 400 includes a solid single deforming die 401 and a connection to forcing equipment. In the example of FIG. 4A, the forcing equipment is a cable 414 that is coupled to the deforming die 401 with a coupler 412. In one example, the cable 414 is pulled the cable puller 200, or similar device (not shown). Other cable pulling equipment, such as a cyclic puller, may also be used.

When used, the pipe loosening device 400 or other pipe loosening devices described below, deforms the pipe to be replaced enough to loosen soil that surrounds the pipe to be replaced, but the deformation is not large enough to tear the pipe to be replaced apart. In this way, the pipe to be replaced maintains enough integrity to be pulled from the ground without fracturing, but the loosened soil reduces friction on an outer surface of the pipe to be replaced, facilitating easier removal. In example systems and methods using pipe loosening device 400 or other pipe loosening devices described below, the pipe to be replaced is first loosened within the soil, then after loosening, a pipe puller system as described in examples of the present disclosure, is used to pull the loosened pipe from the ground.

The solid single deforming die 401 includes a leading end cylinder portion 402 and a trailing end cylinder portion 404. The leading end cylinder portion 402 includes a leading end axis 403, and the trailing end cylinder portion 404 includes a trailing end axis 405. The leading end axis 403 and the trailing end axis 405 are substantially aligned.

In one example, both the leading end cylinder portion 402 and the trailing end cylinder portion 404 have a first diameter. In one example, the first diameter substantially matches an inner diameter of a pipe to be replaced. In one example, the leading end cylinder portion 402 and the trailing end cylinder portion 404 slide within the pipe to be replaced with a close tolerance fit. In one example the close tolerance fit serves to guide the solid single deforming die 401 and determines how a deforming force is applied using a deforming cylinder portion 406.

As noted, the solid single deforming die 401 includes a deforming cylinder portion 406 coupled between the leading end cylinder portion 402 and the trailing end cylinder portion 404. The deforming cylinder portion 406 includes an axis 407 that is displaced by a distance 410 away from the trailing end axis and the leading end axis. In one example, the deforming cylinder portion 406 is coupled between the leading end cylinder portion 402 and the trailing end cylinder portion 404 using a gentle transition or slope. In one example, this configuration helps to gradually apply a deforming force to a sidewall of a pipe to be replaced.

In one example, one or more of the leading end cylinder portion 402, the trailing end cylinder portion 404, and the deforming cylinder portion 406 includes a material that is hardened to resist galling or cold welding on the inside of the pipe to be replaced. In one example, one or more of the leading end cylinder portion 402, the trailing end cylinder portion 404, and the deforming cylinder portion 406 is formed from a hardened steel. In one example a hardness is within a range of 60-65 Rockwell C. In one example, one or more of the leading end cylinder portion 402, the trailing end cylinder portion 404, and the deforming cylinder portion 406 is case hardened, carburized, or otherwise coated to have a hard external surface.

In one example, a hardened insert is mechanically attached to wear points on one or more of the leading end cylinder portion 402, the trailing end cylinder portion 404, and the deforming cylinder portion 406. An example of attachment includes, but is not limited to, screws, bolts, welding, adhesives, dovetail joints etc. Examples of hardened inserts includes, but is not limited to, tungsten carbide, or other carbides, hardened tool steel, coated tool steel, etc.

In one example a low friction insert may be used. An example of a low friction insert includes, but is not limited to an aluminum-bronze alloy. In the example of aluminum-bronze, such an alloy provides a low friction in relation to several pipe material, specifically black iron. In one example, a lubricant may be used to further reduce friction and any resulting galling or cold welding.

FIG. 4B shows another example of a pipe loosening device 420 according to one example. The pipe loosening device 420 includes a solid single deforming die 401 and a connection to forcing equipment. In the example of FIG. 4B, the forcing equipment is a drill stem 428 from a directional drill. As noted above, in other examples, the pipe loosening device 420 may be pulled by a cable.

In the example of FIG. 4B, a threaded connection 422 is shown on the leading end cylinder portion 402. In one example, a second threaded connection 424 is shown on the trailing end cylinder portion 404. Various combinations of threaded connections may be used in different combinations. In the example shown in FIG. 4B, the solid single deforming die 401 is flexible in the method of connection to forcing equipment. Either pushing or pulling equipment may be used. In the example, shown, the threaded connections 422, 424 are both female threads. However, the invention is not so limited. One or both of the threaded connections 422, 424 may be male threads instead. In one example, one or more of the threaded connections 422, 424 may include a tapered thread, to mate with a tapered thread on a directional drill stem.

FIG. 4C shows another pipe loosening device according to one example. A deforming die 450 is shown that may be used in a manner similar to the examples shown in FIGS. 4A and 4B. The deforming die 450 includes a cylinder portion 452. In one example, the cylinder portion 452 have a first diameter. In one example, the first diameter substantially matches an inner diameter of a pipe to be replaced. In one example, the cylinder portion 452 slides within the pipe to be replaced with a close tolerance fit. In one example the close tolerance fit serves to guide the deforming die 450 and determines how a deforming force is applied using deforming inserts as described below.

FIG. 4C shows a first end insert 454, a second end insert 456, and a middle insert 458. In one example, the inserts 454, 456, 458 include tungsten carbide inserts. Although tungsten carbide is used as an example, other hard materials may also be used. Examples include, but are not limited to, other carbide materials, hardened tool steels, ceramic materials, etc. Inserts may be secured to the cylinder portion 452 in a number of possible configurations, such as welding, or adhesive such as epoxy to secure inserts within a pocket. Inserts may also be secured using threaded fasteners through a hole from a side of the cylinder portion 402 opposite the inserts. In one example, the inserts are replaceable.

Figure 4D:
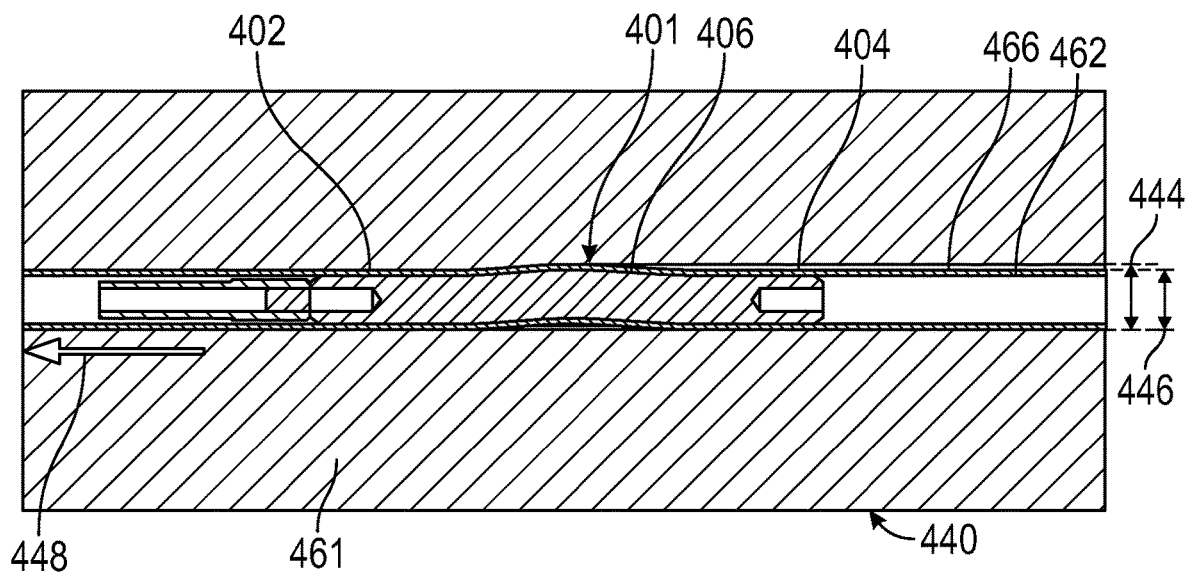
FIG. 4D is a pipe loosening device in use in accordance with some embodiments of the invention.

FIG. 4D shows another example of a pipe loosening device 440 according to one example. The pipe loosening device 440 includes a solid single deforming die 401 and a connection to forcing equipment. The pipe loosening device 440 in FIG. 4C is shown in operation within a pipe to be replaced 462. The pipe to be replaced is shown embedded within soil 461. In operation, the solid single deforming die 401 is pulled or pushed in direction 448. The diameter of the leading end cylinder portion 402 and the trailing end cylinder portion 404 substantially matches an inner diameter 446 of the pipe to be replaced 462. Because of the substantial matching, the leading end cylinder portion 402 and the trailing end cylinder portion 404 guide the solid single deforming die 401 through the pipe to be replaced 462 in a controlled manner.

As the solid single deforming die 401 is pulled, the deforming cylinder portion 406 is forced against a sidewall of the pipe to be replaced 462. The deforming cylinder portion 406 pushes the sidewall portion outward into the surrounding soil and causes a gap 466 to form between the sidewall of the pipe to be replaced 452 and the soil 450. In one example, the pipe to be replaced 452 is not burst or in any other way split or opened to the soil 461. Bursting, splitting, or otherwise opening up the pipe to be replaced 462 to the surrounding soil may cause additional unwanted friction when the pipe to be replaced 462 is later removed from the soil along an axis of the pipe. Bursting, splitting, or otherwise opening up the pipe to be replaced 462 may also weaken the pipe to be replaced, and cause it to break during the later extraction operation where the pipe to be replaced 462 is removed from the soil along an axis of the pipe.

FIG. 4D shows how the gap 466 increases dimension 444 to a dimension that is larger than the diameter 446 of the pipe to be replaced. Although the invention is not so limited, in one example, the diameter of the pipe to be replaced is approximately 1.66 inches, and the dimension 444 after passing of the deforming cylinder portion 406 is approximately 1.901 inches. In one specific example, for a ⅝ inch copper OD pipe, the dimension 444 is about 13% of the OD. In another specific example, for a 1½ inch steel OD pipe, the dimension 444 is about 11% of the OD. In another specific example, for a 2 inch steel OD pipe, the dimension 444 is about 9% of the OD.

As illustrated in FIG. 4A, in one example, in order to deform, but not burst the pipe to be replaced 462, the deforming cylinder portion 406 includes an axis 407 that is displaced by a distance 410 away from the trailing end axis and the leading end axis that is between 5 and 15 percent of the diameter of the leading end cylinder portion 402 and the trailing end cylinder portion 404. In one example, the displacement 410 is approximately 7 percent of the diameter of the leading end cylinder portion 402 and the trailing end cylinder portion 404. In one example, the displacement 410 decreases as the OD of the pipe to be replaced increases.

As noted above, the diameter of the leading end cylinder portion 402 and the trailing end cylinder portion 404 will vary depending on the inner diameter of the pipe to be replaced 462. However, in one example, the percent displacement of the distance 410 away from the trailing end axis and the leading end axis is proportional, depending on the diameter of the pipe to be replaced.

In one example, the passing of the solid single deforming die 401 through the pipe to be replaced 462 will loosen the pipe from within the soil 461. after loosening, the pipe to be replaced 462 may be pulled from the ground along an axis of the pipe, such as in direction 448. If the pipe is not loosened from the soil 461, the pipe may tear, with portions of the pipe undesirably remaining in the soil 461.

When using a pipe loosening device (for example devices 400, 420, 450, 440) it may be advantageous to hold the pipe in the ground against the deforming force needed to pull the pipe loosening device through the pipe to be replaced. Although the eventual goal is to remove the pipe from the ground, it may be advantageous to loosen the whole pipe before attempting to extract the pipe from the ground.

Figure 5A:
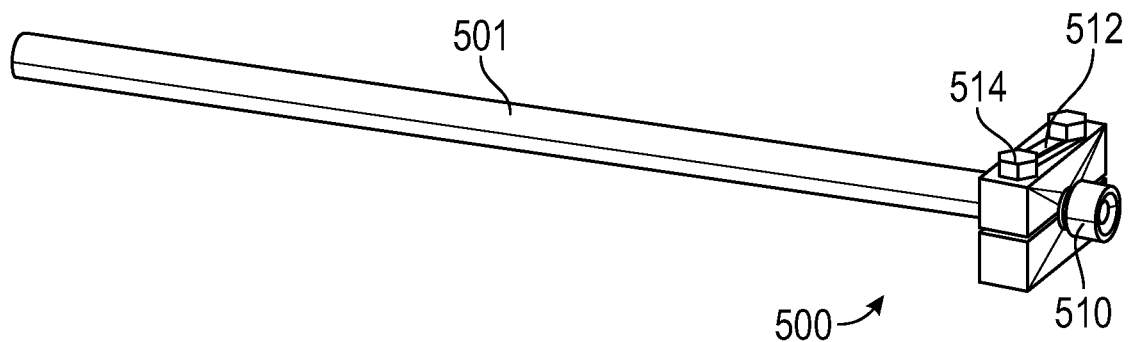
FIG. 5A is a perspective view of selected components of a pipe puller system in accordance with some embodiments of the invention.
Figure 5B:
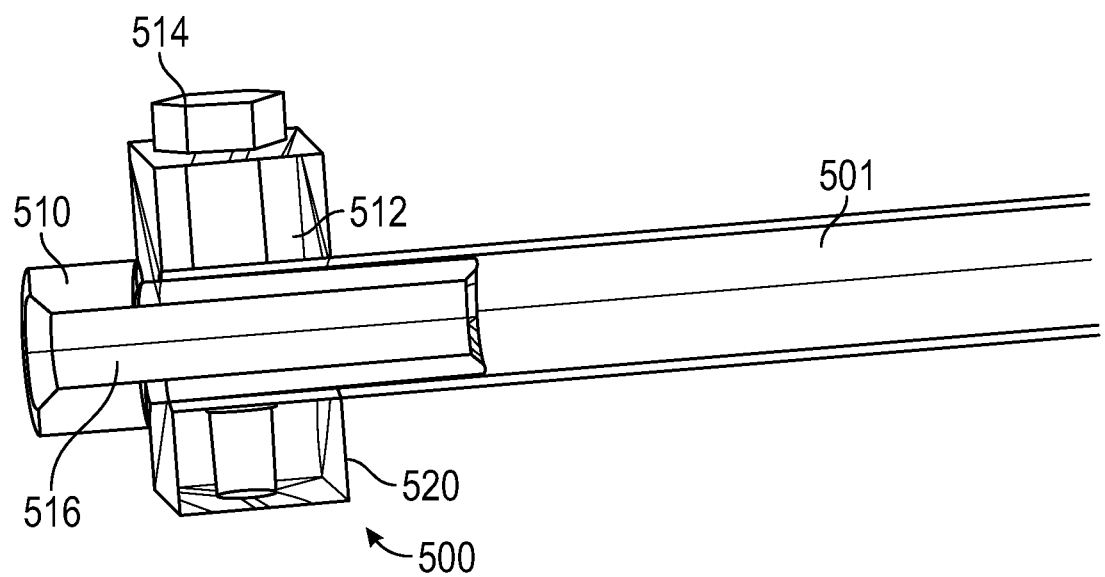
FIG. 5B is a cross section perspective view of the pipe puller system from FIG. 5A in accordance with some embodiments of the invention.

FIGS. 5A and 5B illustrate an example of a retainer system 500 is shown. In FIG. 5A, an insert 510 is placed within an inner diameter of a pipe to be replaced 501. FIG. 5B shows a cross section of the insert 510 illustrating a portion that is placed inside the inner diameter of a pipe to be replaced 501. A clamp 512 is then fastened over an end of the pipe to be replaced 501, such that the clamp 512 grasps the end of the pipe to be replaced 501 between the clamp 512 and the insert 510. A fastener 514, such as one or more bolts, is used to actuate the clamp 512. Although a threaded fastener such as bolts are used as an example, any fastener or actuator may be used within the scope of the invention. A central passage 516 is shown within the insert 510 providing access to the interior of the pipe to be replaced.

In another example, a flare fitting nut may be installed on the pipe to be replaced 501 and used as a retainer system. Conventional flare fittings provide a configuration where an inner diameter of the pipe to be replaced is maintained, because no parts are placed within the inner diameter of the pipe to be replaced. The flared portion of the pipe provides a structural feature that holds against the flare fitting nut. It may be advantageous to keep an inner diameter of the pipe to be replaced as large as possible in order to allow a pipe loosening device to enter the pipe to be replaced.

In operation, the retainer system 500 may be installed on the pipe to be replaced at an entrance pit while the pipe is still in the ground. A pipe loosening device (for example devices 400, 420, 450, 440) may then be pulled through the central passage 516 in the insert 510, and into the pipe to be replaced. As the pipe loosening device is pulled, the retainer system 500 may be pulled against the soil and provide a reaction force against the soil to keep the pipe to be replaced from pulling into the ground prematurely. The retainer system 500 helps facilitate the pulling of the pipe loosening device all the way through the pipe to be replaced, thus providing a loosening action along the whole length of the pipe.

After the pipe is loosened, the retainer system 500 may be removed, and the pipe to be replaced may be pulled from the ground more easily using pipe puller systems as described in various examples above.

Figure 6A:
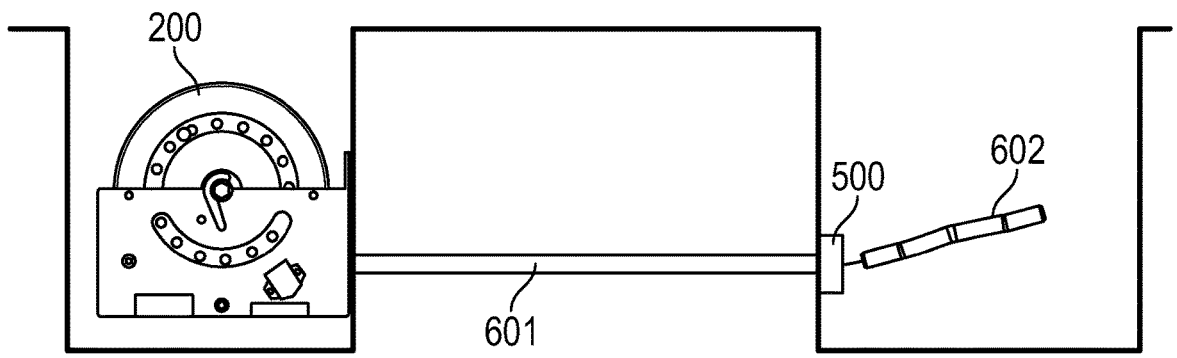
FIG. 6A is a side view of a pipe puller system in operation in accordance with some embodiments of the invention.
Figure 6B:
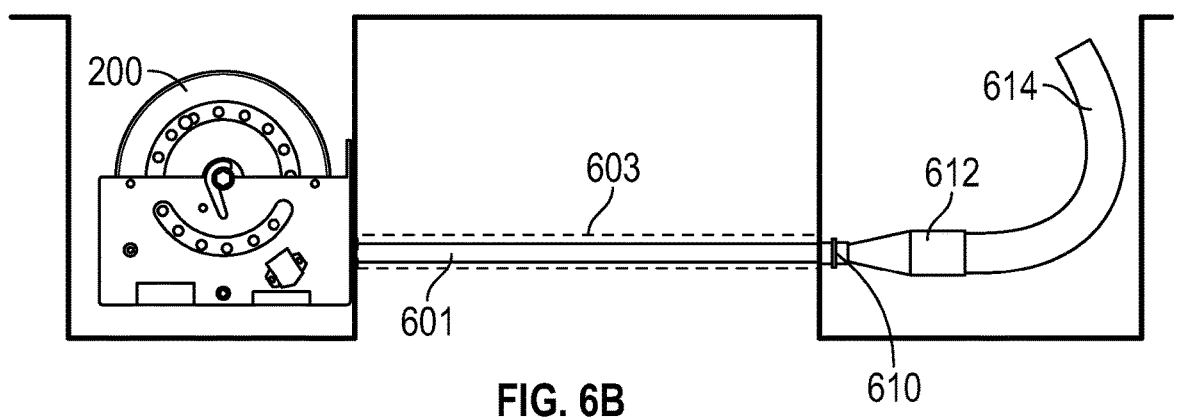
FIG. 6B is another side view of a pipe puller system in operation in accordance with some embodiments of the invention.
Figure 6C:
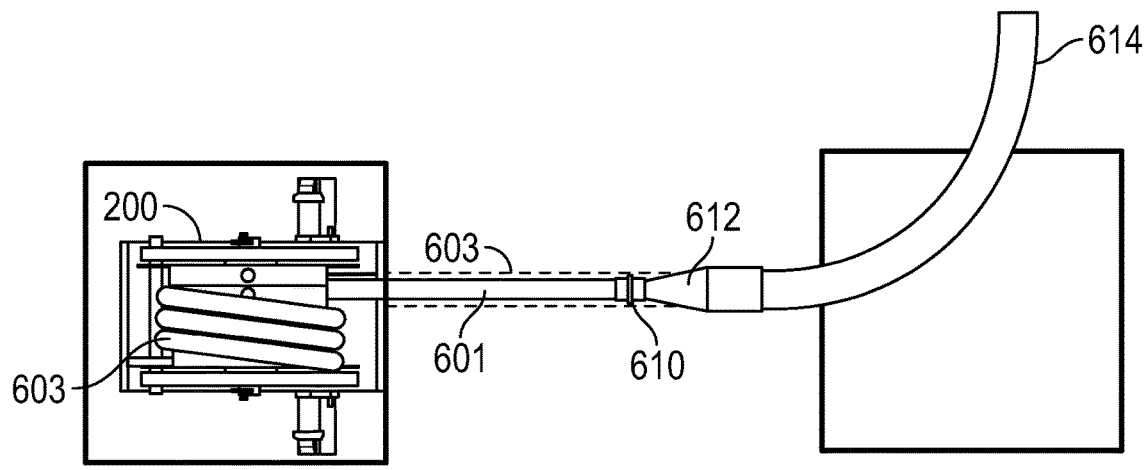
FIG. 6C is a top view of a pipe puller system in operation in accordance with some embodiments of the invention.

FIGS. 6A-6C illustrate one example method of pulling pipe from the ground using a pipe loosening device as described in examples above. In FIG. 6A, a pipe loosening device 602 is pulled through a pipe to be replaced 601. In the example shown, a cable puller 200 is used to pull the pipe loosening device 602, however the invention is not so limited. Other forcing equipment, such as a separate winch, a directional drill, or other pulling or pushing equipment may be used to pull the pipe loosening device 602 through the pipe to be replaced 601. In the example shown, a retaining device 500 as described in FIGS. 5A and 5B is first installed to hold the pipe to be replaced 601 in place while the pipe loosening device 602 is pulled.

In FIG. 6B, after loosening the pipe to be replaced 601, a zone of loosened soil 603 is present around the pipe to be replaced 601. At this stage, the retaining device 500 is removed, and a collar and lug are installed on the pipe to be replaced 601 as described in examples of pipe puller systems above. Although not shown in FIG. 6B, a first cable and a second cable are coupled to the collar and lug respectively, as described in examples above.

In the example of FIG. 6B, an expander 612 is also shown coupled to a distal end of the pipe to be replaced 601. In FIG. 6B, a new pipe 614 is coupled behind the expander 612.

As described in examples above, when using a first and second cable, in conjunction with a collar and lug, extraction force may be applied to more than one location of the pipe. This allows additional extraction force to be exerted without tearing or buckling the pipe. As shown in FIG. 6C, after actuating the cable puller 200, the pipe to be replaced 601 is pulled from the ground, and spooled around one or more drums of the cable puller 200. FIG. 6C illustrates a number of windings 603 of the pipe to be replaced 601 as then are spooled on the drum or drums and extracted from the ground. In the option shown in FIGS. 6B and 6C, the new pipe 614 is also drawn into the ground at the same time that the pipe to be replaced 601 is removed.

The zone of loosened soil 603 provided by the operation shown in FIG. 6A reduces a starting friction that must be exceeded to start pulling the pipe to be replaced 601 from the ground. The addition of the expander 612 further facilitates pulling in the new pipe 614 by expanding the surrounding soil to make room for the new pipe 314.

Figure 7:
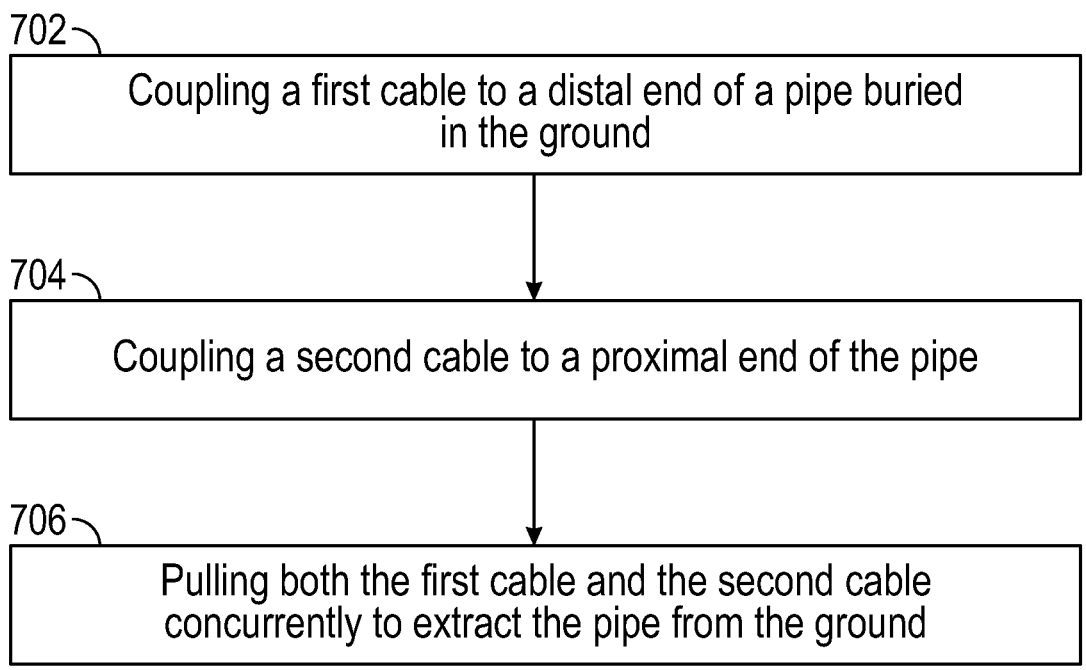
FIG. 7 is a flow diagram of a method of pipe extraction in accordance with some embodiments of the invention.

FIG. 7 shows a flow diagram of an example method of pipe extraction. In operation 702, a first cable is coupled to a distal end of a pipe buried in the ground. In operation 704, a second cable is coupled to a proximal end of the pipe. In operation 706, both the first cable and the second cable are pulled concurrently to extract the pipe from the ground.

Figure 8:
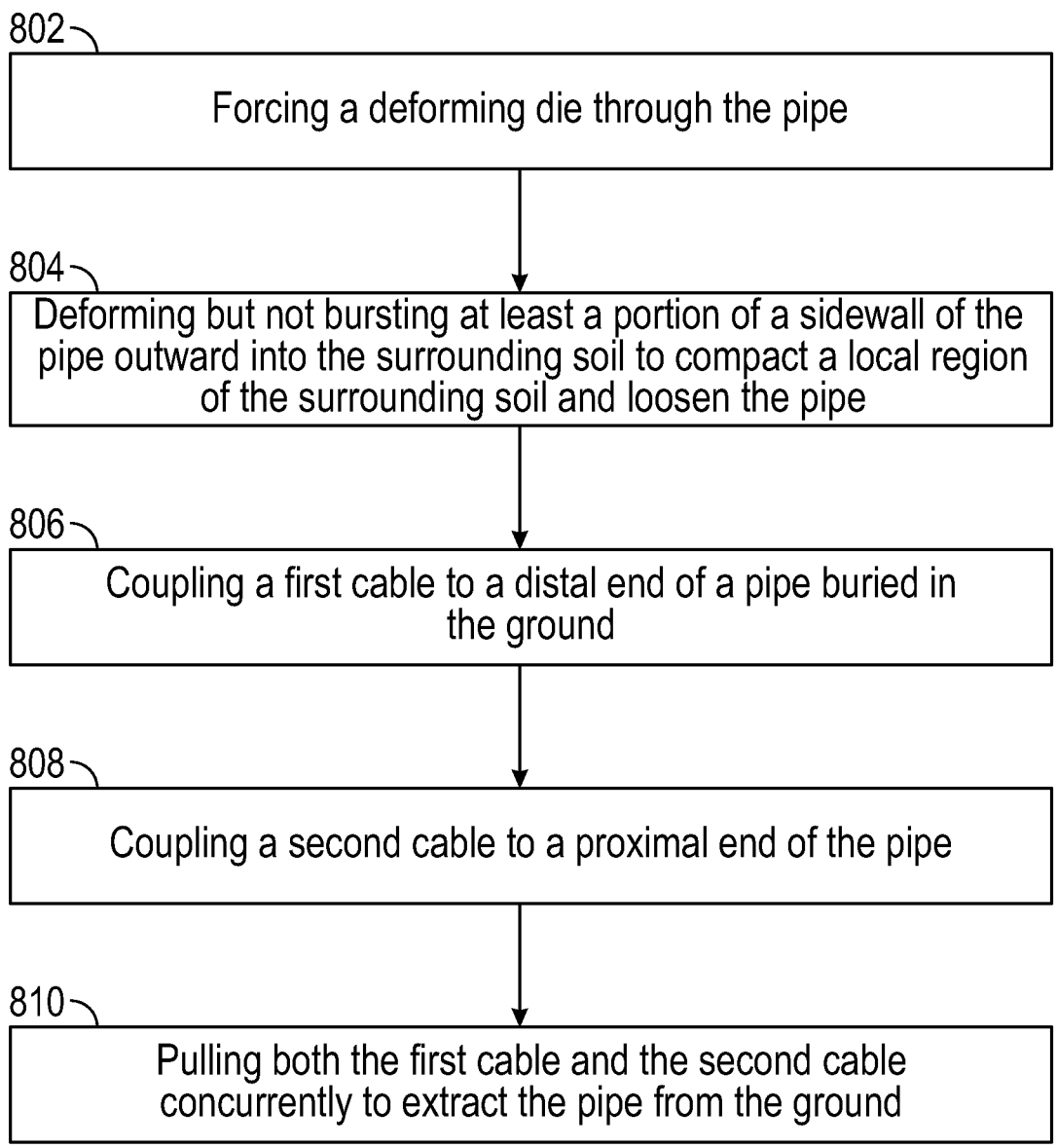
FIG. 8 is a flow diagram of another method of pipe extraction in accordance with some embodiments of the invention.

FIG. 8 illustrates another flow diagram of an example method of pipe extraction. In operation 802, a deforming die is forced through a pipe to be replaced. In operation 804, at least a portion of a sidewall of the pipe is deformed outward into the surrounding soil, but not burst, to compact a local region of the surrounding soil and loosen the pipe. In operation 806, a first cable is coupled to a distal end of the pipe. In operation 808, a second cable is coupled to a proximal end of the pipe. In operation 810, both the first cable and the second cable are pulled concurrently to extract the pipe from the ground.

Any number of possible pipe typed may be replaced using the devices and methods shown. Examples include, but are not limited to, lead pipes, copper pipes, natural gas pipes, etc. In one particular example, small diameter black iron gas pipe may be replaced using the devices and methods described above. In may be necessary to remove small diameter black iron gas pipe from the ground, instead of bursting the pipe, due to concerns for new plastic pipe being drawn in to the ground to replace the black iron pipe. In some instances, bursting may be inadequate to move the old pipe out of the way of the new pipe being drawn in. The old pipe may cut or damage the new pipe. In such an instance, it may be desirable to remove the old pipe from the ground.

To better illustrate the method and apparatuses disclosed herein, a non-limiting list of examples is provided here:

Example 1 includes a method of pipe extraction. The method includes coupling a first cable to a distal end of a pipe buried in the ground, coupling a second cable to a proximal end of the pipe, and pulling both the first cable and the second cable concurrently to extract the pipe from the ground.

Example 2 includes the method of example 1, further including before coupling the first cable to the distal end of the pipe, forcing a deforming die through the pipe, and deforming but not bursting at least a portion of a sidewall of the pipe outward into the surrounding soil to compact a local region of the surrounding soil and loosen the pipe.

Example 3 includes the method of any one of examples 1-2, further including adjusting a force differential between the first cable and the second cable.

Example 4 includes the method of any one of examples 1-3, wherein coupling the second cable to the proximal end of the pipe includes coupling a collar to the proximal end of the pipe and coupling a the second cable to the collar.

Example 5 includes the method of any one of examples 1-4, wherein coupling the first cable to the distal end of the pipe includes routing the first cable through the collar at the proximal end of the pipe.

Example 6 includes the method of any one of examples 1-5, further including attaching an expander to the distal end of the pipe.

Example 7 includes the method of any one of examples 1-6, wherein further including pulling in a new pipe as the old pipe is removed from the ground.

Example 8 includes a cable puller. The cable puller includes a first drum coupled to a first drive motor, a second drum coupled to a second drive motor, the second drum rotating coaxially with the first drum and rotating independently from the first drum, and a drive controller adapted to control the first drive motor and the second drive motor to drive the first drum and the second drum at the same time and to adjust a pulling force independently for each of the first drum and the second drum.

Example 9 includes the cable puller of example 8, wherein the first drive motor includes a hydraulic motor.

Example 10 includes the cable puller of any one of examples 8-9, wherein the second drive motor includes a hydraulic motor.

Example 11 includes the cable puller of any one of examples 8-10, wherein the first drive motor is coupled to the first drum using a gear drive.

Example 12 includes the cable puller of any one of examples 8-11, wherein the second drive motor is coupled to the second drum using a gear drive.

Example 13 includes the cable puller of any one of examples 8-12, wherein the first drum and the second drum include swage pockets to couple to cables.

Example 14 includes the cable puller of any one of examples 8-13, wherein the first drum is wider than the second drum.

Example 15 includes the cable puller of any one of examples 8-13, wherein the first drum is removable and replaceable.

Example 16 includes a pipe puller system. The pipe puller system includes a lug to couple to a distal end of a pipe to be removed, a collar to couple to a proximal end of the pipe to be removed, a first cable to couple to the lug, a second cable to couple to the collar, and a dual cable puller to pull both the first cable and the second cable at the same time to apply force to the pipe to be removed at both the distal end and the proximal end at the same time.

Example 17 includes the cable puller system of example 16, wherein the collar includes an inner sleeve and outer clamp portions.

Example 18 includes the cable puller system of any one of examples 16-17, wherein the collar includes a swage pocket to receive the second cable.

Example 19 includes the cable puller system of any one of examples 16-18, wherein the collar includes a passage for the first cable to pass through.

Example 20 includes the cable puller system of any one of examples 16-19, wherein the lug is further coupled to an expander.

Example 21 includes the cable puller system of any one of examples 16-20, further including a new pipe coupling located behind the expander.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method of pipe extraction, comprising:
   coupling a first cable to a distal end of a pipe buried in the ground;
   coupling a second cable to a proximal end of the pipe; and
   pulling both the first cable and the second cable in parallel to extract the pipe from the ground, wherein a pulling force of on the first cable is controlled separately from a pulling force on the second cable.

2. The method of claim 1, further including:
   before coupling the first cable to the distal end of the pipe, forcing a deforming die through the pipe; and
   deforming but not bursting at least a portion of a sidewall of the pipe outward into the surrounding soil to compact a local region of the surrounding soil and loosen the pipe.

3. The method of claim 1, further including adjusting a force differential between the first cable and the second cable.

4. The method of claim 1, wherein coupling the second cable to the proximal end of the pipe includes coupling a collar to the proximal end of the pipe and coupling the second cable to the collar.

5. The method of claim 4, wherein coupling the first cable to the distal end of the pipe includes routing the first cable through the collar at the proximal end of the pipe.

6. The method of claim 1, further including attaching an expander to the distal end of the pipe.

7. The method of claim 1, further including pulling in a new pipe as the old pipe is removed from the ground.

8. A cable puller, comprising:
   a first drum coupled to a first drive motor;
   a second drum coupled to a second drive motor, the second drum rotating coaxially with the first drum and rotating independently from the first drum; and
   a drive controller adapted to control the first drive motor and the second drive motor to drive the first drum and the second drum at the same time and to adjust a pulling force independently for each of the first drum and the second drum, while maintaining a same pulling speed for both the first drum and the second drum.

9. The cable puller of claim 8, wherein the first drive motor includes a hydraulic motor.

10. The cable puller of claim 8, wherein the second drive motor includes a hydraulic motor.

11. The cable puller of claim 8, wherein the first drive motor is coupled to the first drum using a gear drive.

12. The cable puller of claim 8, wherein the second drive motor is coupled to the second drum using a gear drive.

13. The cable puller of claim 8, wherein the first drum and the second drum include swage pockets to couple to cables.

14. The cable puller of claim 8, wherein the first drum is wider than the second drum.

15. The cable puller of claim 8, wherein the first drum is removable and replaceable.

16. A pipe puller system, comprising:
- a lug to couple to a distal end of a pipe to be removed;
- a collar to couple to a proximal end of the pipe to be removed;
- a first cable to couple to the lug;
- a second cable to couple to the collar; and
- a dual cable puller to pull both the first cable and the second cable in parallel to apply force to the pipe to be removed at both the distal end and the proximal end at the same time, wherein the dual cable puller is configured to control a pulling force on the first cable separately from a pulling force on the second cable.

17. The pipe puller system of claim 16, wherein the collar includes an inner sleeve and outer clamp portions.

18. The pipe puller system of claim 16, wherein the collar includes a swage pocket to receive the second cable.

19. The pipe puller system of claim 16, wherein the collar includes a passage for the first cable to pass through.

20. The pipe puller system of claim 16, wherein the lug is further coupled to an expander.

21. The pipe puller system of claim 20, further including a new pipe coupling located behind the expander.

* * * * *